United States Patent
Chen et al.

(10) Patent No.: US 6,724,569 B1
(45) Date of Patent: Apr. 20, 2004

(54) THIN FILM WRITER WITH MULTIPLAYER WRITE GAP

(75) Inventors: Yingjian Chen, Fremont, CA (US); Kyusik Sin, Palo Alto, CA (US); Ronald A. Barr, Mountain View, CA (US)

(73) Assignee: Western Digital (Fremont), Inc., Lake Forest, CA (US)

( * ) Notice: Subject to any disclaimer, the term of this patent is extended or adjusted under 35 U.S.C. 154(b) by 0 days.

(21) Appl. No.: 10/227,171

(22) Filed: Aug. 23, 2002

Related U.S. Application Data

(63) Continuation of application No. 09/505,092, filed on Feb. 16, 2000, now abandoned.

(51) Int. Cl.$^7$ ................................. G11B 5/23
(52) U.S. Cl. .................. 360/119; 360/317; 360/319; 360/126
(58) Field of Search .................. 360/317, 319, 360/119, 126

(56) References Cited

U.S. PATENT DOCUMENTS

| | | | |
|---|---|---|---|
| 5,103,553 A | 4/1992 | Mallary | 29/603.13 |
| 5,142,768 A | 9/1992 | Aboaf et al. | 29/603.12 |
| 5,691,867 A | 11/1997 | Onuma et al. | 360/126 |
| 5,793,578 A | 8/1998 | Heim et al. | 360/126 |
| 5,940,253 A | 8/1999 | Mallary et al. | 360/126 |
| 6,195,229 B1 | 2/2001 | Shen et al. | 360/72.1 |
| 6,301,075 B1 | 10/2001 | Sato | 360/126 |

Primary Examiner—Jefferson Evans

(57) ABSTRACT

Embodiments in accordance with the thin film write head of the present invention have a lower pole structure, an upper pole structure, and a multilayer write gap extending from an air bearing surface between the upper and lower pole structures. In preferred embodiments, the write gap comprises at least two of: (a) a first layer covering a lower pole tip portion of the lower pole structure, (b) a second layer covering turns of a semiconductor winding, or (c) a third layer covering a winding insulation stack. In more preferred embodiments, the write gap is formed of the first, the second, and the third write gap layers. An advantage of a write head with a multilayer write gap is that it allows better control of write gap thickness. As such, loss of write gap thickness can be compensated for by deposition of the second write gap layers, or by deposition of the third write gap layer. Some embodiments have one or more additional advantages in providing increased corrosion prevention, improving the integrity of conductor insulation, and/or improving the top pole magnetic material characteristics.

38 Claims, 2 Drawing Sheets

THIN FILM WRITER WITH MULTIPLAYER WRITE GAP

This is a continuation of Ser. No. 09/505,092, filed Feb. 16, 2000, now abandoned.

BACKGROUND OF THE INVENTION

BACKGROUND

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is an important measured write head performance. Data density is determined by the amount of data stored on an area of magnetic media and depends on how much area must be allocated to each bit. Data on magnetic media is often stored in a line or track. Magnetic media often have multiple tracks. In the case of the disk, the tracks are nested annular rings. More bits per ring and more rings per disk increases data density. Data density, therefore, is determined not only by the bit length, but also by the width of the bit which determines the track width. To decrease bit size, head size is decreased by fabricating thin film read and write heads. Thin film heads commonly employ separate write and read heads, which may be formed into a merged head structure.

Thin film write heads typically are formed by depositing and etching layers of magnetic, dielectric, and electrically conductive materials to provide the structures of the head. A typical write head has upper and lower pole structures having opposing pole tip portions separated by a write gap layer. A conductor winding, typically having an inorganic insulation stack such as cured photoresist, is formed on the conductors which surround a back gap.

In operation, the conductor winding generates magnetic flux through the pole structures and across the write gap at the pole tips. The write heads typically do not contact the magnetic media, but instead are separated from the magnetic media by a layer of air or air bearing. Magnetic flux generated across the write gap acts across the air bearing to change the magnetic moment of an area on the magnetic media.

As data bits are placed closer together to improve data density, a higher coercivity media is required to prevent bits from inadvertently being changed by adjacent bits, or by stray magnetic flux. As a result, a larger magnetic field across the write gap is required to set the bits. To produce this larger magnetic field, ever smaller structures must provide higher magnetic flux densities. Often, the structures of the write head are formed of high moment materials to provide the required flux densities.

High moment materials, though, are more sensitive to process techniques and write head architecture. Some high moment materials, for example, are more readily subject to corrosion if exposed to air. In addition, the magnetic properties of high moment materials can degrade if deposited over sloped surfaces. Further, the present inventors also have observed that materials sputtered on the sloped areas of stack insulation can deposit with a porous or rough surface that can degrade the magnetic properties of any materials plated thereon. Additionally, the rough surface can diffract light during the photolithographic exposure process, reducing mask sharpness and impacting pole tip definition.

In addition to requiring high moment materials, production of larger magnetic fields also requires greater magnetomotive force. As such, optimum performance of the conductor winding also is important. One impediment to optimum performance observed by the present inventors is that conductors can corrode or oxidize within the stack insulation, thus increasing operating temperature and conductor resistance. This can occur during the insulation stack curing process and cause a shell of oxidation to form on the surface of the conductor.

Another problem associated with conventional windings identified by the present inventors is that pin holes in the stack insulation can cause shorting to the upper pole structure. This is more likely to occur as stack insulation height is reduced to improve write head performance. Also, etching or milling to define the upper pole structure from high $B_{sat}$, or other sputtered material, can result in milling through outlying portions of the stack insulation and into the conductor winding, thus reducing conductor winding performance.

A further drawback with conventional write heads noted by the present inventors is that thermal expansion of cured photoresist stack insulation can degrade write head performance. It can cause a magneto-strictive effect in the pole material which can cause a rotation of the easy axis, reducing the high frequency response of the write head. Further, thermal expansion can ultimately lead to delamination of stack insulation and the upper pole structure.

BRIEF SUMMARY

Embodiments in accordance with the thin film write head of the present invention have a lower pole structure, an upper pole structure, and a multilayer write gap extending from an air bearing surface between the upper and lower pole structures. In preferred embodiments, the write gap comprises at least two of: (a) a first layer covering a lower pole tip portion of the lower pole structure, (b) a second layer covering turns of a conductor winding, or (c) a third layer covering a winding insulation stack. In more preferred embodiments, the write gap is formed of the first, the second, and the third write gap layers.

An advantage of a write head with a multilayer write gap is that it allows better control of write gap thickness. As such, loss of write gap thickness can be compensated for by deposition of the second write gap layer, or by deposition of the third write gap layer. Furthermore, the thickness of a subsequently deposited write gap layer/layers may be selected during processing to compensate for unintended loss of first or second write gap layers occurring during write head fabrication. As such write head performance and yield may be better controlled.

In addition, embodiments having the first write gap layer can inhibit oxidation of the planarized lower pole tip during conductor fabrication, which is of particular importance when the lower pole tip is formed of high moment materials more susceptible to corrosion.

Embodiments having the second write gap layer can inhibit corrosion or oxidation of the conductor turns that can form during the curing process used to form the stack insulation. The second write gap layer also may serve as a corrosion protection layer for the lower pole tip during the stack insulation curing process, particularly in embodiments not employing the first write gap layer. Also, the second write gap layer can reduce the roughness of the surface of the coil turns, which may reduce the roughness of the top surface of the stack insulation resulting in improved material properties of the upper pole structure.

Embodiments having the third write gap layer can improve the properties of overlying high moment materials. Moreover, the third write gap layer can reduce magnetostrictive effects and delamination of the write head structures. Also, the third write gap may provide added protection of outlying stack insulation and conductor turns during ion milling processes.

Further, embodiments having the second and/or third write gap layer allow stack insulation height to be reduced by serving as additional protection against shorting of the conductor turns. As such, shorting due to pin holes or other stack insulation non-uniformity may be inhibited in reduced stack height writers.

DESCRIPTION OF THE PREFERRED EMBODIMENTS AND METHODS OF THE INVENTION

Figure 1:
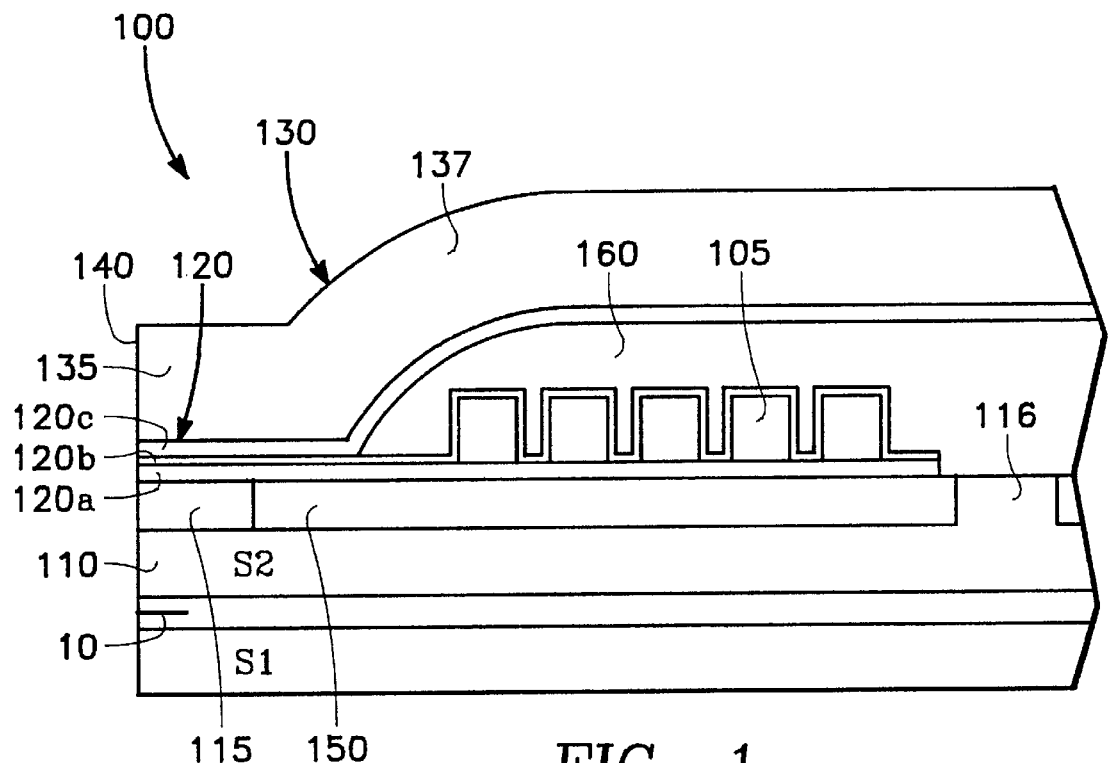
FIG. 1 shows a partial cross-sectional side view of a thin film write head in accordance with an embodiment of the present invention.

FIG. 1 shows a partial cross-sectional side view of a thin film write head 100 in accordance with a preferred embodiment of the present invention. Such an embodiment can be formed over a substrate and over a previously formed read head 10 in a merged head or other configuration known in the art.

The embodiment of FIG. 1 has lower and upper pole structures 110 and 130. The lower pole structure 110 has a pedestal pole tip portion 115 which may be a separate structure, or may be integrally formed from the material of the lower pole structure 110. The upper pole structure 130 has an upper pole tip portion 135 at an air bearing surface 140 and a yoke portion 137.

The lower pole tip 115 opposes the upper pole tip 135 across a write gap 120. Conductor turns 105 form a winding which generates magnetic flux in poles 110 and 130, which is supplied across the right gap 120 at the air bearing surface 140 to write to magnetic media (not shown).

In this preferred embodiment, the write gap 120 is formed of three layers 120a, 120b, and 120c. In other embodiments, at least two layers of 120a, 120b, and 120c may be used to improve write head 100 performance. The sum of the thicknesses of selected write gap layers 120a, 120b, or 120c after fabrication, preferably total the required write gap 120 thickness.

The first layer 120a is formed on the lower pedestal 115 and may extend onto a middle coat layer 150. In the preferred method of fabrication, the first write gap layer 120a is formed on the lower pole tip 115 and the middle coat 150 after a planarization step and before conductor turns 105 formation. Depositing the first write gap layer 120a before conductors formation inhibits oxidation of the planarized lower pole tip 115 during conductor fabrication. It also inhibits oxidation of the lower pole tip 115 during probe testing of the conductor turns 105 or other functionality testing. In addition, it also can serve to inhibit oxidation of the lower pole tip 115 during the curing process used to form the stack insulation 160, particularly in embodiments not employing the second write gap layer 120b. As such, the first write gap layer 120a serves as corrosion protection layer for the lower pole tip 115 after planarization, which is of particular importance when the lower pole tip 115 is formed of high moment materials more susceptible to corrosion.

The second layer 120b extends over the conductor turns 105. The second write gap layer 120b inhibits corrosion or oxidation that can form on the conductor turns 105 during the curing process used to form the stack insulation 160. The second write gap layer 120b also may serve as a corrosion protection layer for the lower pole tip 115 during the stack insulation curing process, particularly in embodiments not employing the first write gap layer 120a.

Furthermore, the present inventors have found that formation of the second layer 120b on the conductor turns 105 reduces the roughness of the surface of the coil turns 105, which reduces the roughness of the top surface of the stack insulation 160. Reducing the roughness of the stack insulation can improve material properties of the upper pole structure 130, thus improving performance of the write head as discussed further below.

The third write gap layer 120c formed on, or over, the insulation stack 160 has been observed by present inventors to improve the properties of overlying high moment materials. Empirical measurements of seed layers has indicated that higher Fe content NiFe films, such as NiFe45% and NiFe55%, deposited directly onto substrates coated with cured photoresist show increased coercivity and lose desirable magnetic anisotropic properties. More specifically, the easy axis of a NiFe45% seed was rotated nearly 90 degrees, and NiFe55% was magnetically isotropic. The data showed properties of the seed layer can be improved by depositing onto $Al_2O_3$ rather than cured photoresist, or by depositing on an $SiO_2$ layer deposited on cured photoresist.

Further, adhesion of the deposited magnetic films to an inorganic insulation film, such as for example $Al_2O_3$, is generally stronger than to a cured photoresist stack insulation 160 material. For example, it has been observed by the present inventors that a FeRhN/CoZrCr laminated film deposits with a rough film surface on cured photoresist stack insulation, especially on its sloping surface. By depositing magnetic films on to an inorganic insulation film deposited over the cured photoresist stack insulation better microstructural and magnetic properties can be achieved. As such, the third write gap layer 120c may be used to improve deposition characteristics of laminated structures as disclosed in Chen et al. U.S. patent application Ser. No. 09/192,388, filed on Nov. 13, 1998, entitled THIN FILM WRITE HEAD WITH IMPROVED LAMINATED FLUX CARRYING STRUCTURE AND METHOD OF FABRICATION, issued as U.S. Pat. No. 6,233,116 B1 on May 15, 2001; and in Chen et al. U.S. patent. application Ser. No. 09/315,863, filed on May 20,1999, entitled HIGH RESISTIVITY FeXN SPUTTERED FILMS FOR MAGNETIC STORAGE DEVICES AND METHOD OF FABRICATION, issued as U.S. Pat. No. 6,410,170 B1 on Jun. 25, 2002; both herein incorporated by reference in their entireties, as well as to improve the deposition characteristics of conventional high moment upper pole structures.

The smoother surface provided by the write gap layer 120c improves the surface texture as compared to cured photoresist. This in tern improves the grain texture of the upper pole structure, thus improving its performance. Moreover, it is expected that the third write gap layer 120c will reduce magneto-restrictive effects caused by cured photoresist stack insulation. Further, it is anticipated that the third write gap layer 120c will reduce delamination of the write head layers.

The third write gap layer 120c also offers some protection of the stack insulation 160 during the ion milling process used for removing a seed layer used in forming the upper pole structure 130. This is particularly important as the thickness of the stack insulation is reduced to reduce the apex angle. A thin stack insulation 160 may fail to give adequate protection for the conductor turns 105 against extensive ion milling or other wafer processes. In such embodiments, the third write gap layer 120c is preferably formed of low ion milling rate materials, such as for example $Al_2O_3$, AlON or the like, to act a protective layer for outlying cured photoresist insulation.

The second write gap layer 120b and/or the third write gap layer 120c allow stack insulation height to be reduced by serving as additional protection against shorting between the conductor turns 105 and the upper pole structure 130. As such, shorting due to pin holes or other stack insulation 160 non-uniformity may be inhibited in reduced stack height writers, thus allowing for improved head performance. Furthermore, the second write gap layer 102b and/or third write gap layer 120c allow for improved head performance by inhibiting etching or milling into outlying portions (not shown) of the conductor turns 105 when defining the upper pole structure 130 from high $B_{sat}$, or other sputtered material.

An advantage of a multilayer write gap 120 is that it allows better control of write gap 120 thickness. As such, loss of .write gap thickness can be compensated for by deposition of the second write gap layer 120b or by deposition of the third write gap layer 120c. Furthermore, the thickness of subsequently deposited layer/layers 120b or 120c may be selected during processing to compensate for undesired loss of first or second write gap layers 120a or 120b occurring during write head fabrication. As such write head performance and yield may be better controlled.

For example, certain photolithographic steps can result in etching of the write gap material, such as etching of $Al_2O_3$ by the photo developer solution, resulting in a loss of write gap thickness. Such etching is sometimes referred to as windage of the write gap material. Further, over milling, or rework milling, such as of the conductor turns seed layer, also decreases the gap thickness. Hence, if functional probe testing of the conductor turns determines that further etching of conductor seed layer is necessary, additional ion milling and/or wet etching may be used to improve conductor integrity without irreparable loss in required right gap thickness. An optical method may be used to measure existing write gap thickness, such as by reflective laser measurement techniques known in the art, to determine the amount of additional write gap material to be added by the second and/or third write gap layers 120b and 120c.

In some embodiments the thickness of the write gap 120 totals about 1000–3000 Angstroms. The first, second, and third write gap layers 120a, 120b, and 120c each are preferably more than about 200 Angstroms so that they each, or when selectively combined, are sufficient to protect the lower pedestal 115 and the conductor turns 105 from corrosion or oxidation during processing. In embodiments with the third write gap layer, it is preferred that the thickness of the third write gap layer 120c is selected to provide sufficient coverage over the insulation stack 160 to improve the magnetic and microstructural properties of upper pole structure 130 material, and to improve the adhesion of sputtered upper pole structure 130 materials.

The first, second, and third write gap layers 120a, 120b, and 120c may be formed of inorganic materials such as $Al_2O_3$, AlON, AlN, $SiO_2$, SiN, SiON, or the like, or other known dielectric material. Further, layers may be formed of the same, or of different materials.

Figure 2:
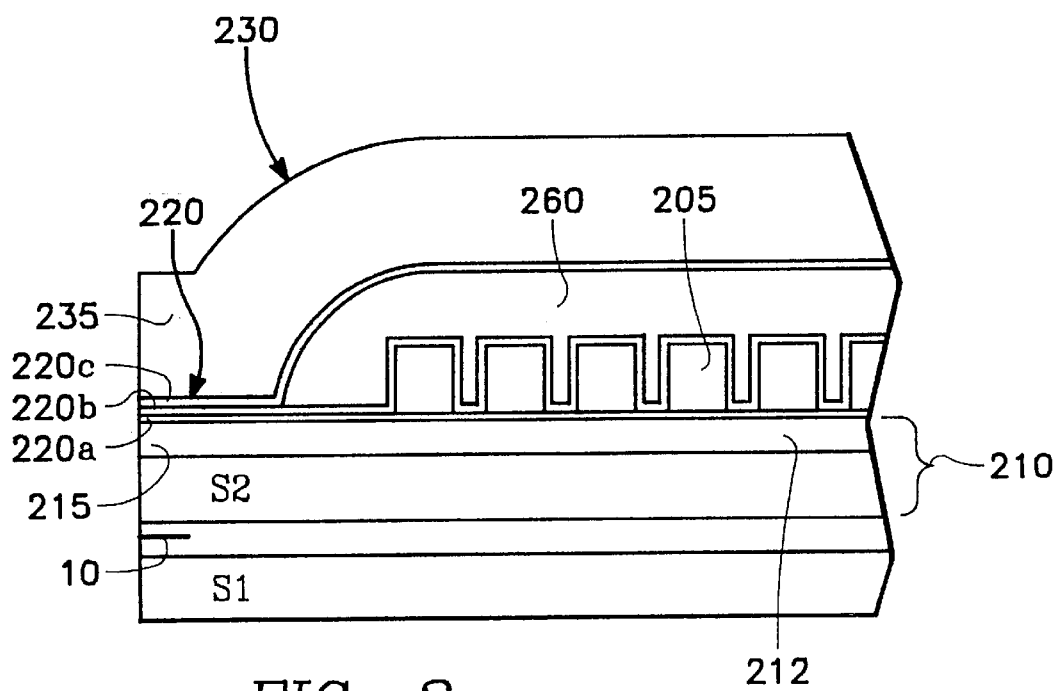
FIG. 2 shows a partial cross-sectional side view of a possible alternate embodiment of a thin film write head in accordance with the present invention.
Figure 3:
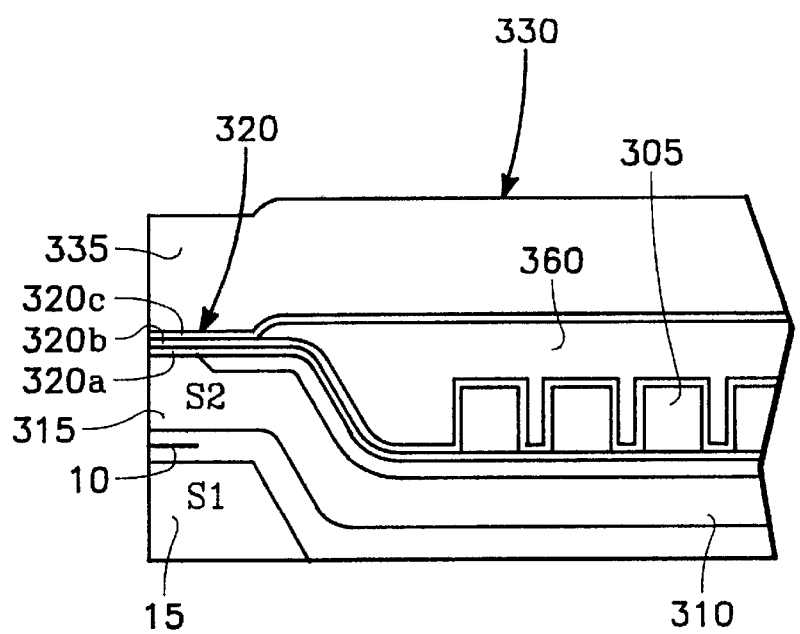
FIG. 3 shows a partial cross-sectional side view of a possible alternate embodiment of a thin film write head in accordance with the present invention.

FIGS. 2–3 show possible alternate embodiments of the present invention. In the embodiment of FIG. 2, the lower pole structure 210 is formed without a pedestal pole tip and is illustrated with a high moment material layer 212 formed on a layer of conventional magnetic material such as an S2 shield structure. In this embodiment, the upper pole tip 235 defines the zero throat of the write head. Preferred embodiments have at least two of the first, second, and third write gap layers 220a, 220b, and 220c, which may cover the lower pole tip portion 215 of the lower pole structure 210, cover the turns of a conductor winding 205, and/or cover the winding insulation stack 260, as discussed above. More preferred embodiments have all three layers forming write gap 220.

In the embodiment of FIG. 3, the lower pole structure 310 defines the zero throat along with providing a sunken well for locating the winding 305 in accordance with U.S. Pat. No. 5,793,578, by Heim et al., issued Aug. 11, 1998, entitled THIN FILM INDUCTION RECORDING HEAD HAVING AN INSET FIRST INSULATION LAYER THAT DEFINES ZERO THROAT HEIGHT AND POLE TIP APEX ANGLE, herein incorporated by reference in its entirety. Preferred embodiments have at least two of the first, second, and third write gap layers 320a, 320b, and 320c, which may cover the lower pole tip portion 315 of the lower pole structure 310, cover the turns of a conductor winding 305, and/or cover the winding insulation stack 360, as discussed above. More preferred embodiments have all three layers forming write gap 320.

Other embodiments, not shown, may have additional turns, such as a second layer of conductor turns, located over a first layer of conductor turns. In such an embodiment, the at least two layers comprising the write gap layer may extend under and over the second layer of conductor turns, as discussed above with respect to conductor turns 105.

The conductor turns or other structures are not limited to the structures or fabrication indicated in FIGS. 1–3 but may be formed in accordance with teachings of: U.S. patent application Ser. No. 09/268,088, by Hong et al., filed on Mar. 12, 1999, entitled ULTRA-SHORT YOKE AND ULTRA-LOW STACK HEIGHT WRITER AND METHOD OF FABRICATION, U.S. patent application Ser. No. 09/325,057, by Hong et al., filed on Jun. 2, 1999, entitled THIN FILM WRITE HEAD WITH INTERLACED COIL WINDING AND METHOD OF FABRICATION, issued as U.S. Pat. No. 6,466,401 B1 on Oct. 15, 2002; and U.S. patent application Ser. No. 09/388,775, by Crue et al., filed on Sep. 2, 1999, entitled THIN FILM WRITE HEAD HAVING REDUCED RESISTANCE CONDUCTOR COIL PARTIALLY RECESSED WITHIN MIDDLE COAT INSULATION, issued as U.S. Pat. No. 6,452,742 B1 on Sep. 17, 2002; all herein incorporated by reference in their entireties.

Figure 4:
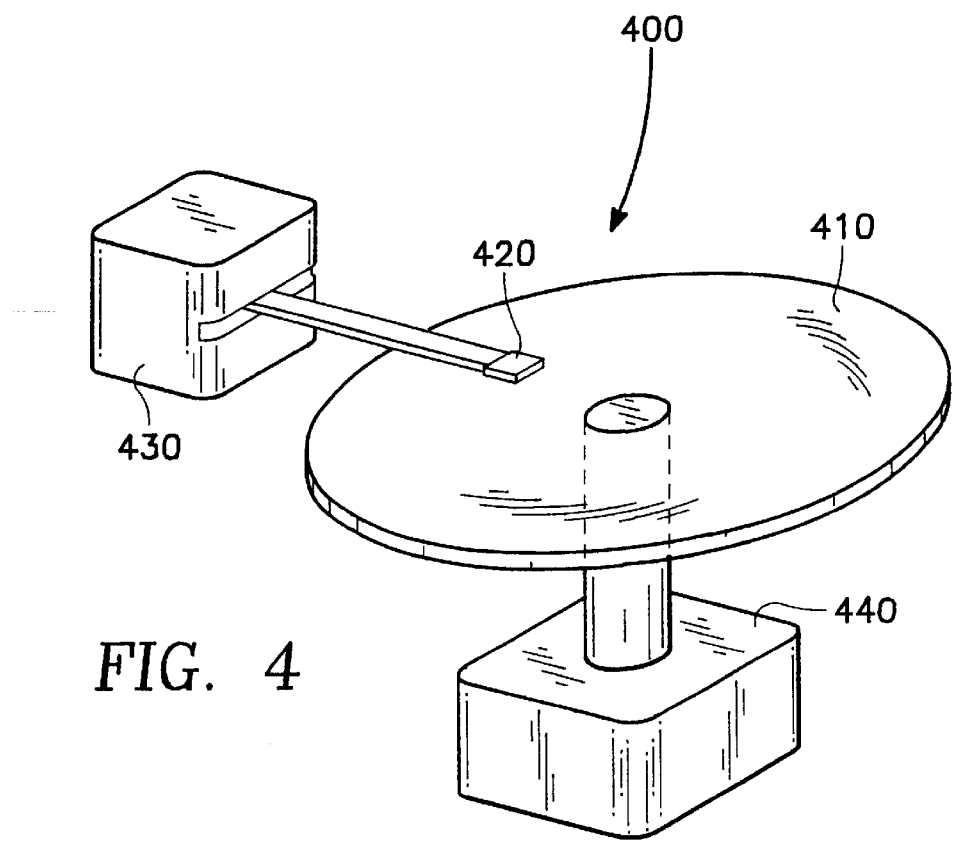
FIG. 4 is a simplified illustration of a data storage and retrieval apparatus employing the write head of the present invention.

Turning to FIG. 4, embodiments of the thin film write head of the present invention may be employed to provide an improved data storage and retrieval apparatus 400. The write head of the present invention may be located within a merged head assembly 420 which rides above a magnetic storage media 410. A positioning means 430 for controlling a relative position of the head assembly 420 and the media 410 is typically provided. In a typical embodiment, the positioning means may provide movement to the media with respect to the head, such as rotational, translational, or the like, to read and write bits along a track. It may also provide an actuating means to move the head assembly with respect to the media to read and write bits to different tracks. In one hard disk type embodiment of the data storage and retrieval apparatus, several hard disks and several corresponding heads may be employed. The improved structure of the present invention is intended to be utilized in all known data storage and retrieval apparatuses. By way of non-exclusive example, the present invention is also intended to improve magnetic tape or stripe type storage and retrieval apparatuses, or any other known types of magnetic storage and retrieval apparatuses.

While the preferred embodiments of the present invention have been described in detail above, many changes to these embodiments may be made without departing from the true scope and teachings of the present invention. The present invention, therefore, is limited only as claimed below and the equivalents thereof.

What we claim is:

1. A thin film write head comprising:
    a lower pole structure;
    an upper pole structure including a yoke portion; and
    a write gap comprising a plurality of layers extending from an air bearing surface between the upper and lower pole structures, said plurality of layers comprising at least two of:
        a first layer covering a lower pole tip portion of the lower pole structure;
        a second layer covering turns of a conductor winding; and
        a third layer covering a winding insulation stack and underlying the yoke portion of the upper pole structure.

2. The thin film write head of claim 1 wherein the write gap comprises the first and the second layers.

3. The thin film write head of claim 1 wherein the write gap comprises the first and the third layers.

4. The thin film write head of claim 1 wherein the write gap comprises the second and the third layers.

5. The thin film write head of claim 1 wherein the write gap comprises the first, the second, and the third layers.

6. The thin film write head of claim 1 wherein the write gap comprises at least three layers extending from the air bearing surface between the upper and lower pole structures.

7. The thin film write head of claim 1 wherein the first write gap layer extends under the layer of turns of the conductor winding.

8. The thin film write head of claim 1, said write gap comprising a first layer, a second layer, and a third layer, wherein the lower pole structure comprises a pedestal pole tip and said first write gap layer extends from the air bearing surface on the pedestal pole tip, and wherein the write head further comprises conductor turns and said second write gap layer extends from the air bearing surface and onto the conductor turns, and wherein the write head further comprises an insulation stack on a portion of the second write gap layer over the conductor turns and said third write gap layer extends from the air bearing surface onto the insulation stack.

9. The thin film write head of claim 1 wherein the write gap comprises at least two of:
    a first layer covering a lower pole tip portion of the lower pole structure;
    a second layer covering a first layer of turns of the conductor winding;
    a third layer covering a first portion of a winding insulation stack;
    a fourth layer covering a second layer of turns of the conductor winding; and
    a fifth layer covering a second portion of the winding insulation stack.

10. The thin film write head of claim 9 wherein the write gap comprises at least three of the first, the second, the third, the fourth, and the fifth layers.

11. The thin film write head of claim 9 wherein the write gap comprises at least four of the first, the second, the third, the fourth, and the fifth layers.

12. The thin film write head of claim 9 wherein the write gap consists all of the first, the second, the third, the fourth, and the fifth layers.

13. The thin film write head of claim 1 wherein the write gap comprises at least two layers adjacent at the air bearing surface and separated away from the air bearing surface by at least one of a layer of conductor turns or a winding insulation stack.

14. A method for forming a thin film write head comprising:
    forming a lower pole structure;
    forming a write gap comprising a plurality of layers extending from an air bearing surface over the lower pole structure, wherein forming the write gap comprises forming at least two of:
        a first layer covering a lower pole tip portion of the lower pole structure;
        a second layer covering a layer of turns of a conductor winding; and
        a third layer covering a winding insulation stack; and, after forming the at least two layers forming an upper pole structure.

15. The method of claim 14 wherein forming the write gap comprises forming the first, the second, and the third layers.

16. The method of claim 14 wherein forming the first write gap layer comprises forming a layer extending under the layer of turns of the conductor winding.

17. The method of claim 16 wherein forming the first write gap layer comprises forming a layer extending over a back gap.

18. The method of claim 14 wherein forming the write gap comprises forming a first layer, a second layer, and a third layer, and wherein forming the lower pole structure comprises forming a pedestal pole tip and planarizing the pedestal pole tip and forming the first write gap layer comprises forming a layer extending from the air bearing surface onto the planarized pedestal pole tip, the method further comprising forming conductor turns, wherein forming the second write gap layer comprises forming a layer extending from the air bearing surface onto the conductor turns, the method further comprising forming an insulation stack over a portion of the second write gap layer on the conductor turns, wherein forming the third write gap layer comprises forming a layer extending from the air bearing surface onto the insulation stack.

19. A data storage and retrieval apparatus comprising:
    magnetic recording media;
    a merged head assembly positioned adjacent the magnetic recording media comprising:
        a read sensor; and a write head comprising:
  a lower pole structure;
  an upper pole structure including a yoke portion; and
  a write gap comprising a plurality of layers extending from an air bearing surface between the upper and lower pole structures, said plurality of layers comprising at least two of:
    a first layer covering a lower pole tip portion of the lower pole structure;
    a second layer covering turns of a conductor winding; and
    a third layer covering a winding insulation stack and underlying the yoke portion of the upper pole structure; and
positioning means for controlling a relative position of the head assembly and the media.

20. The apparatus of claim 19, said write gap comprising a first layer, a second layer, and a third layer, wherein the lower pole structure comprises a pedestal pole tip and said first write gap layer extends from the air bearing surface on the pedestal pole tip, and wherein the write head further comprises conductor turns and said second write gap layer extends from the air bearing surface and onto the conductor turns, and wherein the write head further comprises an insulation stack on a portion of the second write gap layer over the conductor turns and said third write gap layer extends from the air bearing surface onto the insulation stack.

21. The apparatus of claim 19, the plurality of write gap layers comprising at least two of:
  a first layer, situated over the lower pole structure and under turns of a conductor winding;
  a second layer, situated over the lower pole tip portion of the lower pole structure and over turns of a conductor winding; and
  a third layer, situated over the lower pole tip portion of the lower pole structure and over a winding insulation stack.

22. The apparatus of claim 21 wherein a part of the first layer is formed upon the lower pole tip portion of the lower pole structure.

23. The apparatus of claim 22 wherein a part of the second layer that is situated over the lower pole tip portion of the lower pole structure is formed upon a part of the first layer that is formed upon the lower pole tip portion.

24. The apparatus of claim 22 wherein a part of the third layer that is situated over the lower pole tip portion of the lower pole structure is formed upon a part of the first layer that is formed upon the lower pole tip portion of the lower pole structure.

25. The apparatus of claim 21 wherein the lower pole structure includes a pedestal pole tip portion, and the first layer is formed upon the pedestal pole tip portion.

26. The apparatus of claim 25, further comprising a middle coat layer adjacent the pedestal pole tip portion, wherein the first layer is formed upon the pedestal pole tip portion and the middle coat layer.

27. The apparatus of claim 26 wherein the turns of the conductor winding are formed upon the first layer over the middle coat layer.

28. The apparatus of claim 25 wherein a part of the second layer that is situated over the lower pole tip portion of the lower pole structure is formed upon a part of the first layer that is formed upon the pedestal pole tip portion.

29. The apparatus of claim 25 wherein a part of the third layer that is situated over the lower pole tip portion of the lower pole structure is formed upon a part of the first layer that is formed upon the pedestal pole tip portion.

30. The apparatus of claim 21 wherein the turns of the conductor winding are formed upon the first layer.

31. The apparatus of claim 21 wherein a part of the second layer that is situated over the lower pole tip portion of the lower pole structure is formed upon a part of the first layer that is formed over the lower pole tip portion of the lower pole structure.

32. The apparatus of claim 21 wherein a part of the second layer situated over the turns of the conductor winding is formed upon the turns of the conductor winding.

33. The apparatus of claim 21 wherein apart of the second layer that is situated over the lower pole tip portion of the lower pole structure is formed upon the lower pole tip portion of the lower pole structure.

34. The apparatus of claim 33 wherein a part of the third layer that is situated over the lower pole tip portion of the lower pole structure is formed upon a part of the second layer that is formed upon the lower pole tip portion of the lower pole structure.

35. The apparatus of claim 21 wherein the lower pole structure includes a pedestal pole tip portion, and the second layer is formed upon the pedestal pole tip portion.

36. The apparatus of claim 35 wherein a part of the third layer that is situated over the lower pole tip portion of the lower pole structure is formed upon a part of the second layer that is formed upon the pedestal pole tip portion.

37. The apparatus of claim 21 wherein a part of the third layer that is situated over the lower pole tip portion of the lower pole structure is formed upon a part of the first layer that is formed over the lower pole tip portion of the lower pole structure.

38. The apparatus of claim 21 wherein a part of the third layer that is situated over the lower pole tip portion of the lower pole structure is formed upon a part of the second layer that is situated over the lower pole tip portion of the lower pole structure.

* * * * *